350-96.1 SR

XR 3,821,732

X3072R (6)

X3082D

United States
Romney

[11] 3,821,732

[45] June 28, 1974

[54] APPARATUS AND METHOD FOR PRODUCING, COMMUTATING AND TRANSMITTING OPTICAL AND ELECTRONIC SIGNALS

[76] Inventor: Russell H. Romney, 3259 Bon View Dr., Salt Lake City, Utah 84109

[22] Filed: May 14, 1971

[21] Appl. No.: 143,398

Related U.S. Application Data

[63] Continuation-in-part of Ser. No. 38,382, May 18, 1970, Pat. No. 3,656,157.

[52] U.S. Cl. .......... 340/380, 178/DIG. 2

[51] Int. Cl. .......... G08b 5/00

[58] Field of Search .......... 178/DIG. 2; 340/380; 250/219

[56] References Cited

UNITED STATES PATENTS

| | | | |
|---|---|---|---|
| 2,616,983 | 11/1952 | Zworykin et al. | 178/DIG. 2 |
| 2,881,976 | 4/1959 | Greanias | 340/380 |
| 2,967,664 | 1/1961 | Ress | 178/DIG. 2 |
| 3,184,872 | 5/1965 | Way | 178/DIG. 2 |
| 3,238,294 | 3/1966 | Krauss | 178/DIG. 2 |
| 3,240,106 | 3/1966 | Hicks, Jr. | 178/DIG. 2 |
| 3,249,692 | 5/1966 | Clay et al. | 178/DIG. 2 |
| 3,289,777 | 12/1966 | Willyard | 250/219 |

*Primary Examiner*—Richard Murray
*Attorney, Agent, or Firm*—Edwin M. Thomas

[57] ABSTRACT

Electronic signals, e.g., in the form of light beams, are produced. These are sequenced or commutated and transmitted through optical fibers arranged singly, in groups, or in systems of sub-groups. Means are provided to scan, select and transmit illumination, selective data, or analogous bits or continua of energy. Control means include a reversible motor driving commutator elements which are geared and grouped together. These serve to connect selected light fibers, singly or in groups, to a light source and/or to a light sensor, for reading data cards, for scanning areas or objects systematically, including anatomical organs or parts, or for displaying information, guiding human or mechanical operators in selection and/or placement for assembly of small mechanical parts, and analogous functions.

19 Claims, 23 Drawing Figures

3821732
OR IN 340/380

INVENTOR.
RUSSELL H. ROMNEY
BY Edwin M. Thomas
ATTORNEY

PATENTED JUN 28 1974
3,821,732
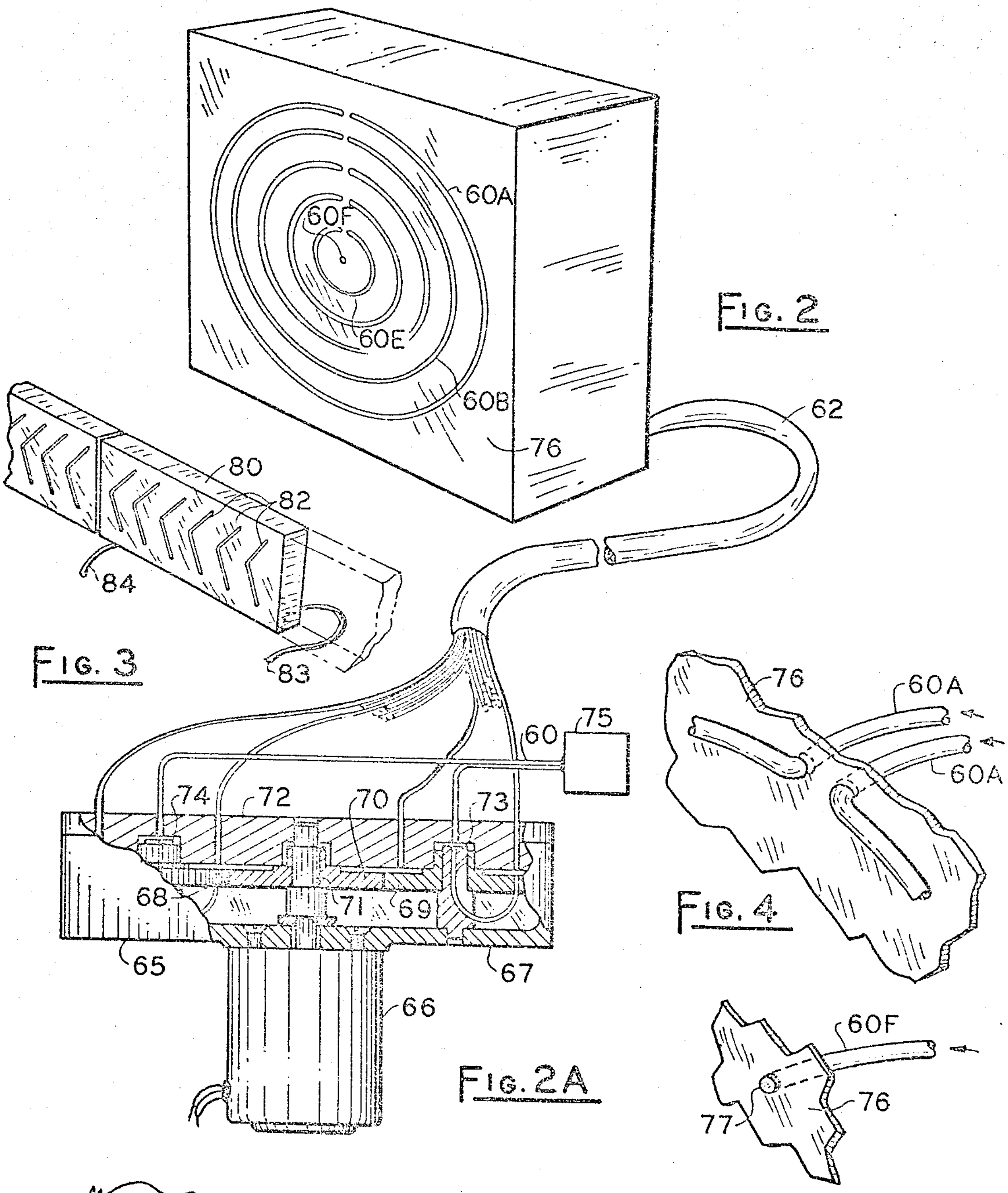
FIG. 2, FIG. 2A, FIG. 3, FIG. 4
FIG. 4A
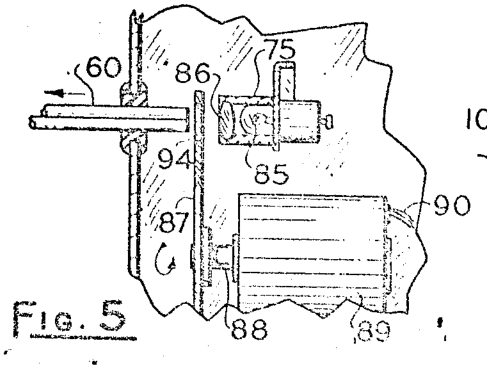
FIG. 5
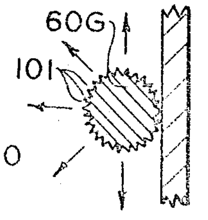
FIG. 6
INVENTOR.
RUSSELL H. ROMNEY
BY Edwin M. Thomas
ATTORNEY INVENTOR.
RUSSELL H. ROMNEY
BY Edwin M. Thomas
ATTORNEY INVENTOR.
RUSSELL H. ROMNEY
BY Edwin M. Thomas
ATTORNEY INVENTOR.
RUSSELL H. ROMNEY
BY Edwin M. Thomas
ATTORNEY

APPARATUS AND METHOD FOR PRODUCING, COMMUTATING AND TRANSMITTING OPTICAL AND ELECTRONIC SIGNALS

The present application is a continuation-in-part of application Ser. No. 38,382 filed May 18, 1970, entitled "Apparatus and Method for Producing and Transmitting Signals" now U.S. Pat. No. 3,656,157.

BACKGROUND AND PRIOR ART

Numerous devices have been proposed in the past for generating, selecting, emitting and transmitting signals or other energy bits or quanta, by means of visible light rays or beams. In general, light rays have been focused, dispersed, collimated and controlled mainly by lenses, prisms and the like. Because of the physical size of conventional lenses, prisms, etc., and the necessary mounts therefor, the usefulness and practical applications of many such devices have been limited. Light beams and photocells and means for directing, controlling and sensing them are widely used, of course, for many simple functions, such as opening or closing doors, controlling packaging, printing and other machinery by sensing the presence or absence of physical marks, elements, or articles. They are often used for giving warning signals in case of abnormal operations, intrusions and the like.

The recent development of flexible plastic light fibers has greatly expanded the uses and possibilities of light beams for transmission, sensing and control purposes. Since such fibers can be very small in diameter, a considerable number of them can be assembled into a small tube, package or other compass. They can be led through narrow passages, around corners, through winding paths and past other obstacles, from an emitter or source of light and/or to various kinds of detectors. They can be led to or projected onto viewing surfaces such as screens and the like. Such fibers usually are made of transparent or highly translucent materials having high internal refraction. They make it possible to transmit small but intense beams of light while eliminating partly or completely the much more bulky and expensive conventional lenses, prisms, and other more common types of optical elements.

Notwithstanding their capabilities, however, and notwithstanding their uses which are rapidly expanding, fiber optics have not been employed widely in a number of areas, partly because of commutation and related control problems. Conventional switches or commutators for shifting from one fiber or set of fibers to another tend to be very complex in many cases, or ponderous and massive in others, thus limiting their applications. The parent application, Ser. No. 38,382, mentioned above, describes an improved switching or commutation device which has particular utility in this invention. One object of the present invention is to amplify the conceptions there disclosed and to apply them to further and wider areas of use. Other and more specific objects will appear below.

SUMMARY

The invention includes gang switching or commutating means and associated equipment geared together for simultaneous movement in unison and so arranged to control the transmission of light beams through single or multiple optical fiber elements. It includes relatively simple manually or motor driven rotatable commutator elements arranged for shifting light beams to or from individual or multiple transmitter elements or in multiple groups of elements. These control elements can be geared together to control the transmission of multiple but separate light beams individually, sequentially or in groups from a single source to a scanning or distributing area, and/or from multiple sources to single or multiple light sensing means, scanning areas, etc. For automatic operation, a simple reversible motor means, driven manually, electrically or otherwise, capable of moving in small, sequential steps, or in continuous rotation in either direction if needed or desired, may be employed to drive the commutator device or group. The latter may be connected to or embodied physically in a gear or set of gears, the associated parts being mutually synchronized to move from fiber to fiber, or from one or more groups of such fibers to a succeeding single fiber or to a group or groups. Specific embodiments are disclosed wherein (1) a group of light fibers is used to scan a conventional data member, such as a punched business machine card or tape, or equivalent; (2) a display sign or signal has separate elements which are lighted sequentially to produce effects of motion or animation by stepping sequentially to different lights; (3) optical viewing devices for biological or medical use can be illuminated in stepped or sequential patterns to facilitate their use, as in a physician's studying the eye or other organs of the body; (4) complex assembly operations using various small parts where precision of placement or selection is difficult but requisite is aided by sequential illumination to guide the assembler; (5) display information for travelers, relating accommodations to geographical locations, etc., are implemented by light beam control means; (6) signals or warnings, e.g., of intruders, are included. Other and analogous uses and embodiments will be mentioned or will be found to be implicit in the specific description given below.

BRIEF DESCRIPTION OF DRAWINGS

FIG. 2 is a perspective and diagrammatic view of another embodiment adapted to display visual data in moving pattern as in an illuminated and animated sign or display.

FIG. 2A shows partly in section the scanning and drive means for this embodiment.

FIG. 3 is a fragmentary perspective view of another sequentially lighted display device operable by the system of FIGS. 2 and 2A.

FIG. 4 is a fragmentary detail view, considerably enlarged, showing a method of reinforcing the illumination of a circular illuminating element of FIG. 2. FIG. 4A shows the arrangement or connection for a central terminal in FIG. 2.

FIG. 5 is a vertical sectional view of a modified means for changing color of the light transmitted in systems such as shown in FIGS. 2 and 3.

FIG. 6 is a sectional view on enlarged scale of means by which illumination from a particular light fiber element may be modified.

DESCRIPTION OF PREFERRED EMBODIMENT

Figures 1, 1A, 11:
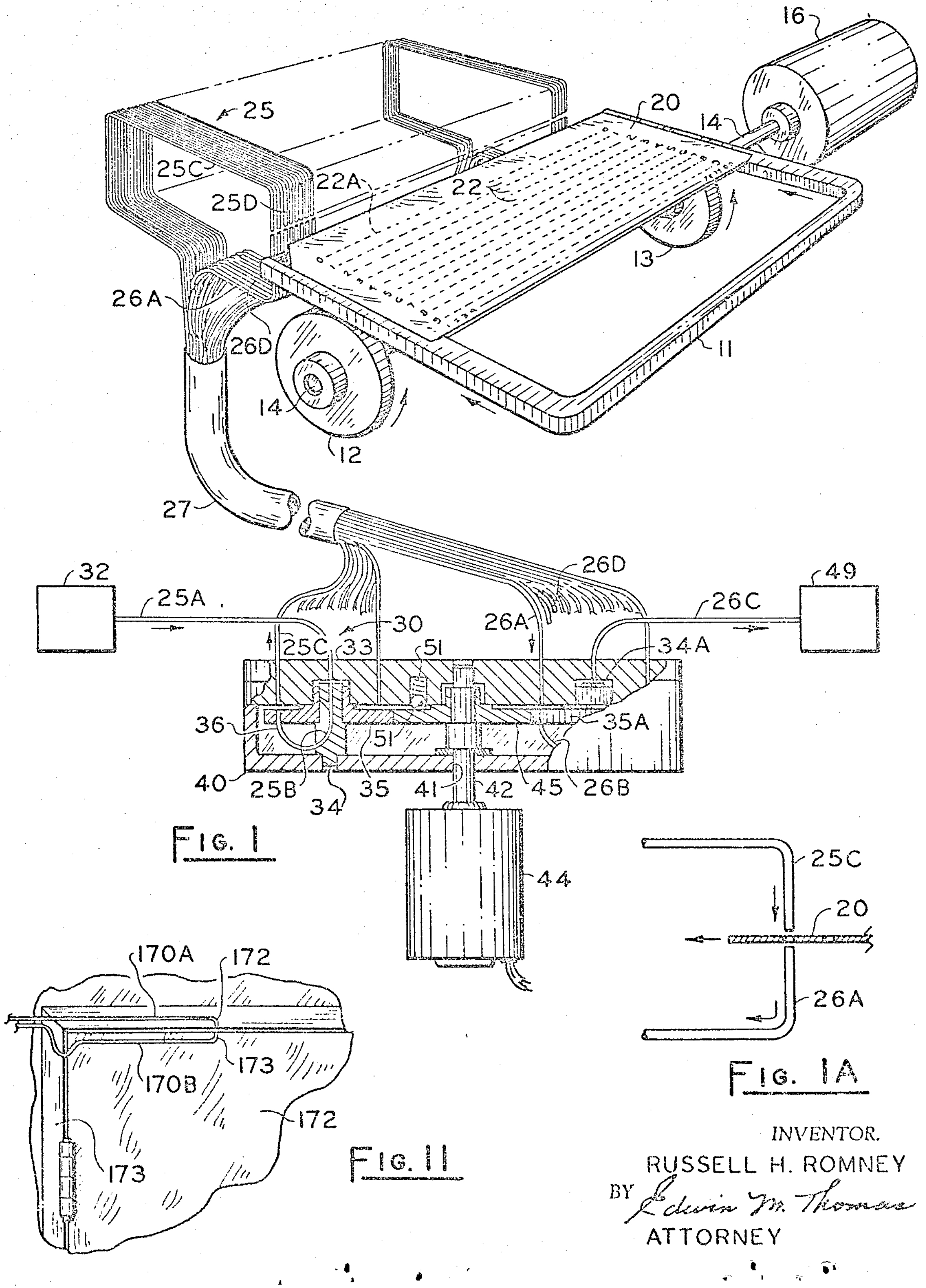
FIG. 1 is a perspective and partly diagrammatic view of an embodiment of the invention as applied to the scanning of conventional data cards and analogous records.
FIG. 1A is a detail sectional view on an enlarged scale, showing relation of light-transmitting elements of FIG. 1 on opposite sides of an object being scanned.
FIG. 11 (Sheet 1) shows fragmentarily a modification designed to give a signal warning connected with a door or window.

Referring first to FIG. 1, there is shown a shiftable table 11 adapted to support a data-bearing member and mounted on rollers or wheels 12, 13. The latter are supported on a rotatable axle 14 mounted in suitable bearings, not shown. This axle or shaft 14 is adapted to be rotated in either direction step by step by a motor 16 which may be driven and controlled in any suitable conventional manner to advance or retract the table.

The table 11 is adapted to support a conventional data card 20 which may be provided with a series of lines of data 22 in conventional fashion. For scanning the data in lines 22, of which there may be 80 elements or more in a typical case, there are provided a series of flexible light transmitting fibers 25. These are combined in a cable 27 and extend from a commutator device, indicated generally at 30, which will be described in further detail. A typical single fiber capable of conducting light is shown at 25A, connected to a light source or emitter 32 of any conventional type.

Light fiber 25A connects through a fixed block 33 by which it is aligned with another fiber element 25B which passes down through the center or hub 34 of a rotatable gear 35. Fiber 25B is returned upwardly into an opening 36 near the periphery of gear 35. Here it aligns with another fiber element 25C, also fixed in the block 33, which leads back into the cable 27.

Other fibers of the set 25 not identified individually are led similarly to other elements distributed around the commutator. This commutator comprises a casing or frame 40 provided with a central opening 41 through which the vertical shaft 42 of a drive motor 44 passes. This shaft 42 carries at its upper end a central or sun gear 45 which is meshed with gear 35 and with another similar planetary gear 35A. It may also engage other gears not shown. Gears 35 and 35A supported in frame 40 under the stationary upper block are shown. Obviously, motor 44, which can be driven in either direction, serves to rotate the commutator gears 35 and 35A so as to shift the light connection between fiber 25A and 25B to line up with other and sequential fibers such as 25C, 25D, etc. That is to say, a group of light fibers, such as 25C, will be secured to block 33. As the gear 35 is rotated, the fiber 25B will align consecutively with different ones of these fibers 25C. As shown in FIG. 1 at the top, fibers 25C, 25D line up with return fibers 26A, 26D, etc. Movement of gear 35 effects a scanning, character by character, along a line of data such as the top line 22A in FIG. 1. Thus, a complete rotation of gear 35 may be sufficient to scan all the characters in a given row of data on the card. However, if desired, part of these may be scanned by one gear 35 and others by another similar gear, not specifically shown in FIG. 1.

The return circuit of light fibers embodies the fiber elements 26A, 26D which also are assembled and run through a cable 27. These are led to the right hand portion of block 33 as seen in FIG. 1. Here a typical fiber 26A passes through the block 33 and is aligned momentarily with a fiber element 26B supported in gear 35A. Fiber 26B loops down and then bends upwardly into the center of hub 34A of gear 35A. Here it is aligned with another fiber element 26C which is led to a light sensing device 49 such as a photocell. The latter may be part of a printer, recorder, computer or other device for sensing and/or recording the data sensed in the line 22A of characters or perforations on card 20 is scanned. Other lines 22 will be scanned in succeeding operations, as the card is advanced line by line at proper intervals by motor 16.

In order to prevent misalignment of any gear 35 or 35A with its fiber elements, a ball detent 50 is mounted in an opening in block 33. This is resiliently pressed into a shallow recess in the top of the center or drive gear 45 by a spring 51. This insures that the intermittent rotation of the gears 35, 35A, will stop in accurately aligned position so that the light will be fully transmitted through the proper fiber elements 25A, 25B, 25C, etc., and will be returned through similar elements 26A, 26B and 26C.

As a line scanning is completed, the card shifts to the next line, being moved by means of the motor 16 which is rotated step by step in accurately controlled increments. The table 11 may be formed with a rack on either end or both ends of its under surface to mesh with teeth on the rollers 12 which may be formed as gears. However, in many cases a friction drive is adequate and gearing is not always essential.

The means by which the data sensed by the scanning operation are recorded or otherwise utilized form no part of the present invention. FIG. 1A shows how optical fibers 25C are aligned with fibers 26A to scan an opening or conversely to sense an opaque spot in a translucent record if desired on the card 20. In the latter case, of course, interruption of the light rather than its transmission would supply the signal to the receiver.

Referring now to FIG. 2, there is shown a sign or animated display system controlled by optical fibers. The display itself also may be lighted by optical fibers 60A, 60B, etc., to 60E. These latter fibers are connected at both ends, as seen in FIG. 4, and pass through a cable 62 to a commutator structure shown generally at 65, FIG. 2A, which is substantially like that of FIG. 1, already described. It comprises a drive motor 66, a frame 67, in which rotatable gears 68 and 69 are supported to turn in planetary fashion around the central or sun gear 70 driven by the upright shaft 71 of motor 66. The manner in which the light fibers are attached to the upper block or blocks 72 and to the hubs 73 and 74 of gears 69 and 68 respectively is essentially the same as the arrangement in FIG. 1, already described. In the latter case, the fibers indicated collectively at 60 are led from a light source 75, passed through the commutator and through cable 62 through the sign. Preferably, two ends of each loop 60A, for example, are lighted simultaneously, to increase illumination, and to offset light attenuation. The loop part 60A, or 60B, etc., is surface roughened or otherwise treated to give off light towards the viewer, whereas in other parts, each fiber is dark by reason of total internal refraction.

FIG. 3 shows an analogous system wherein a shifting array of elements 82 simulates a series of arrows migrating from right to left, for example. These elements mounted in a block or base 80 are shown. The individual light elements 82 are connected through cable 83 or 84, or both, to commutator mechanism and to a light source as in FIG. 2A.

The individual ring lighting elements 60A of FIG. 2 may be connected at one end only to light source 75, rather than in the manner shown in FIG. 4. In either case, the connecting fiber passes through the face plate 76 of the display sign. The central electrode 60F which shows only an illuminated end of a fiber is shown at the center 77 in face plate 76, FIG. 4A.

A constant color, or a color sequence, may be imposed on the various fibers or the color on a single fiber, or set of fibers, can be changed from time to time by interposing a color device. Thus, a rotatable wheel carrying different colored plates may be interposed between the light source and the ends of the light fibers adjacent to such source. Such an arrangement is shown in FIG. 5. Here the light fibers 60, which may be brought in in groups, if desired, are aligned with the light source 75 which is provided with a light element such as an incandescent filament 85 and a lens 86. The rotatable light wheel 87 is mounted on a shaft 88 of a drive motor 89 supplied with power from any suitable source through leads 90. This color wheel carries plates or inserts 94 of different colors of glass or other translucent material so that as each color is moved in front of the light source, the color of light transmitted through the optical fibers 60 is changed.

As already mentioned, in order to increase the emission of light from optical fibers when used as lighting elements in a display design, the outer surface of a fiber 60G may be roughened. Such roughening is indicated at 101 FIG. 6. This greatly increases the emission of light laterally from the light fiber. Obviously, this also disperses the light in the fiber and limits transmission along the length of the fiber. However, for a reasonable length of the elements shown in FIGS. 2 and 3, these roughened fibers give good illumination and are effective for the purpose of display. Connection of both ends of each of the elements 60A, 60B, etc., to the light source reduces the loss.

Figures 7, 8, 9:
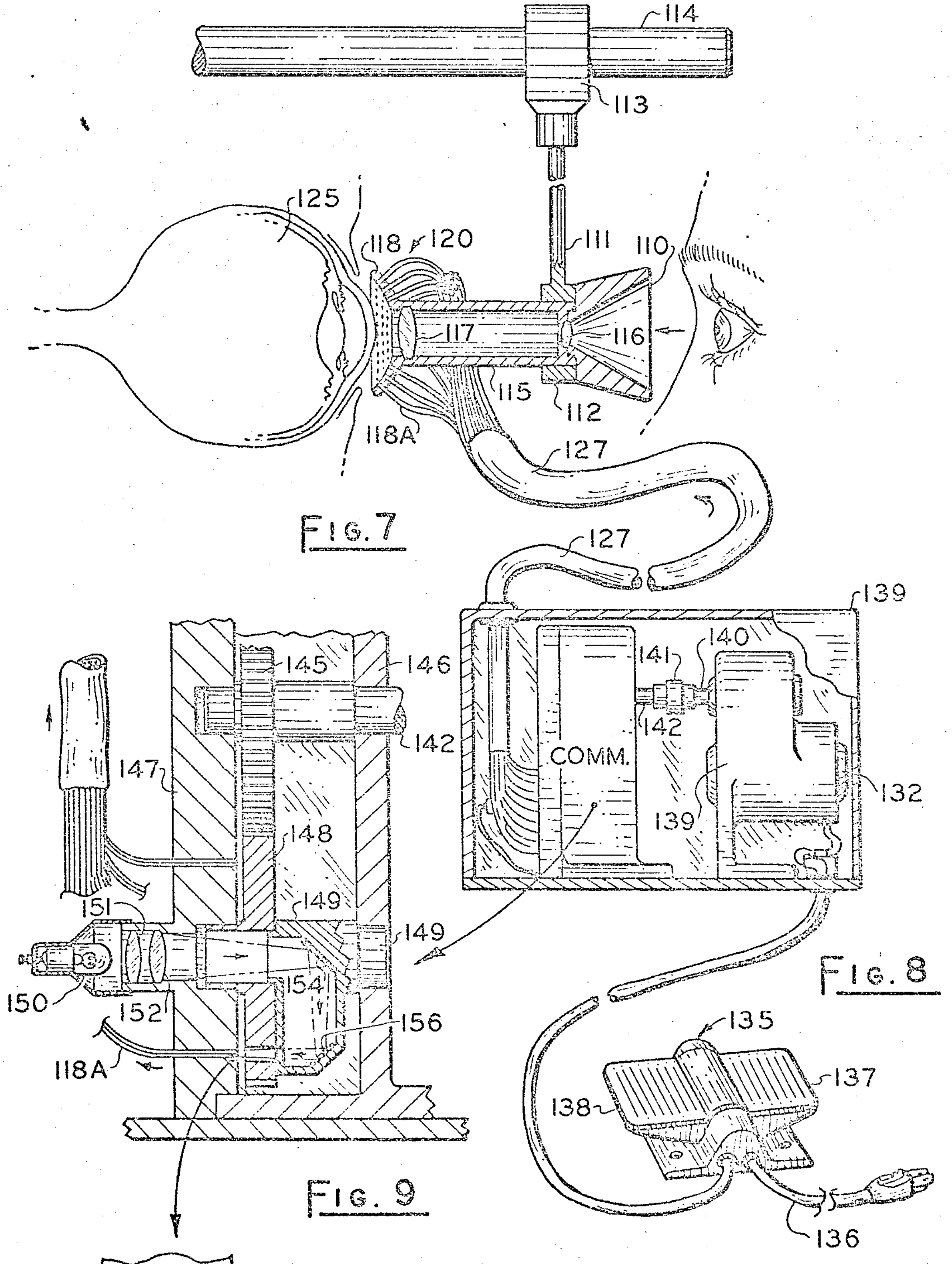
FIG. 7 is an elevational view, with parts in section, of a system usable for sequential study of various aspects of an object, such as a human eye.
FIG. 8 shows a drive and control means for the apparatus of FIG. 7.
FIG. 9 is a fragmentary vertical sectional through a modified light controller.

Referring now to FIG. 7, there is shown an optical device 110 supported by ring 112 on a rod 111 depending from a bracket 113 on an upper support member 114. Obviously, the device can be supported manually or on the user's head. The optical device itself consists of a telescope or magnifier 115 of conventional type having magnifying eyepiece lens 116 and an objective lens 117. The left end of the viewing device is provided with a cup or bell-shaped extension 118 into which a considerable number of light fibers 120 are secured in appropriate groupings. The commutator arrangement is such that one or a small group of these fibers may be lighted at any one time and the light may be shifted rapidly from fiber to fiber or from group to group for examination of the eye 125 from different aspects. That is, the eye 125 may be scanned in a spiral pattern as rapidly and as many times as desired.

The light fibers 118A, etc., are carried through a cable 127 to an appropriate commutating and illuminating device. The latter and its controls are shown in FIG. 8.

The commutator of FIG. 8 comprises appropriate commutator equipment for connecting various fibers in desired sequence to a light source in much the same manner as explained in connection with FIGS. 1 and 2. In the lower part of FIG. 8 a motor control device is shown for moving the drive motor 132 in either direction and in steps as desired. Such controls are well known in office dictating machines, for example. The drive motor 132, FIG. 8, which operates the commutator mechanism described more fully below, and analogous to that of FIGS. 1 and 2, is adapted to be driven in either direction through control device 135. The latter comprises an electrical power connection 136 adapted to be connected to any suitable source of power. The right-hand pedal 137 causes clockwise rotation, for example, and a reversing pedal 138 at the left provides for counterclockwise rotation. Motor 132 drives a gear reducing mechanism housed in box 139 which drives an output shaft 140 at suitable speed. The latter is connected through a coupling 141 to the drive shaft 142 of a suitable commutator mechanism. The plural conductors 118A, grouped together as a cable 127, collectively furnish the illumination for the optical viewing device and a commutator having a fixed first point at which light is brought in, and a movable second point, which travels along a predetermined path to various positions, illuminates the various fibers 118A in turn and at the proper times.

A commutator mechanism which includes a conventional optical means at the fixed terminal is shown in FIG. 9. It comprises a sun gear 145 mounted on shaft 142 and supported in a frame or base plate 146 and a commutator block 147. Gear 145 meshes with one or more commutator gears 148, which may be planetary gears each mounted on a suitable axle 149 supported in frame 146. A light source shown here as an incandescent light 150 transmits light through focusing lenses 151 and 152 onto a mirror or prism 154, which reflects to a second mirror 156 and thence into an opening 157 in gear 148. The latter is aligned in appropriate sequence with various optical fiber elements 118A. These lead in the manner already described into cable 127 from which they furnish illumination at the desired time and in proper sequence to various portions of the object being examined, such as the eye of FIG. 7.

Figure 10:
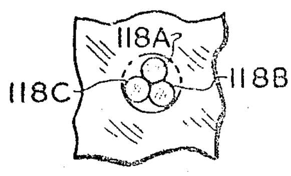
FIG. 10 is an enlarged sectional detail showing grouping of optical fiber elements.

A group of fibers 118A preferably are illuminated simultaneously from the single light source. Such a group is shown consisting of three such fibers in fragmentary sectional, FIG. 10. Such an arrangement can be disposed opposite the opening 157 in the planetary gear 148 just described. Thus, if desired, several fibers may be lighted at once, or a group may be lighted in turn and kept lighted for a time to give the shifting illumination required.

FIG. 11, on Sheet 1, shows an arrangement by which a group of optical fibers typified at 170A and 170B may be utilized in a burglar alarm device. The fibers indicated with mutually facing end portions at 172 and 173, respectively, will be mounted so that normally the ends line up with each other. Light is transmitted ordinarily through the whole circuit, consisting of the fibers, the light source, a commutator, and a light detector means, not shown. The latter may, of course, be of the same general type as indicated in FIG. 1. When the door 172 which is secured or hinged to a frame 173 is opened, the misalignment between fiber ends 172 and 173 cuts off the light and this may be used to give a signal. Similarly, other doors and windows, and various other elements to be safeguarded, may be equipped with matching fibers so that when any pair of these fibers are misaligned, a scanning of the whole group of fibers, by the commutator device not shown but operating just as in FIGS. 1 or 9, will reveal the fact that a door or window has been moved. As in the case of scanning line 22A on the card 20, FIG. 1, when a commutated fiber fails to shine, this will reveal the misalignment and give a signal, such as sounding an alarm. Obviously, this arrangement may be applied to various other systems and alarms, using analogous principles.

Referring now to FIGS. 12 to 15, an arrangement is shown for making use of the light fiber and commutation system for assisting in assembly operations, as in factories when small parts are to be inserted in intricate devices. It has been suggested by others in the art that illuminated boards can be set up to guide workers in locating quickly the required placement for such small elements as transistors, resistors, capacitors, etc., e.g., on circuit boards of television sets, radio receivers and analogous electronic devices. In the arrangement shown in FIG. 12, a multiple compartment tray 190 is shown mounted on a vertical rotatable shaft 191, the latter being supported in ball bearings 192 and 193 in upper and lower frame elements or blocks 194 and 195, respectively.

Figures 12, 13, 14:
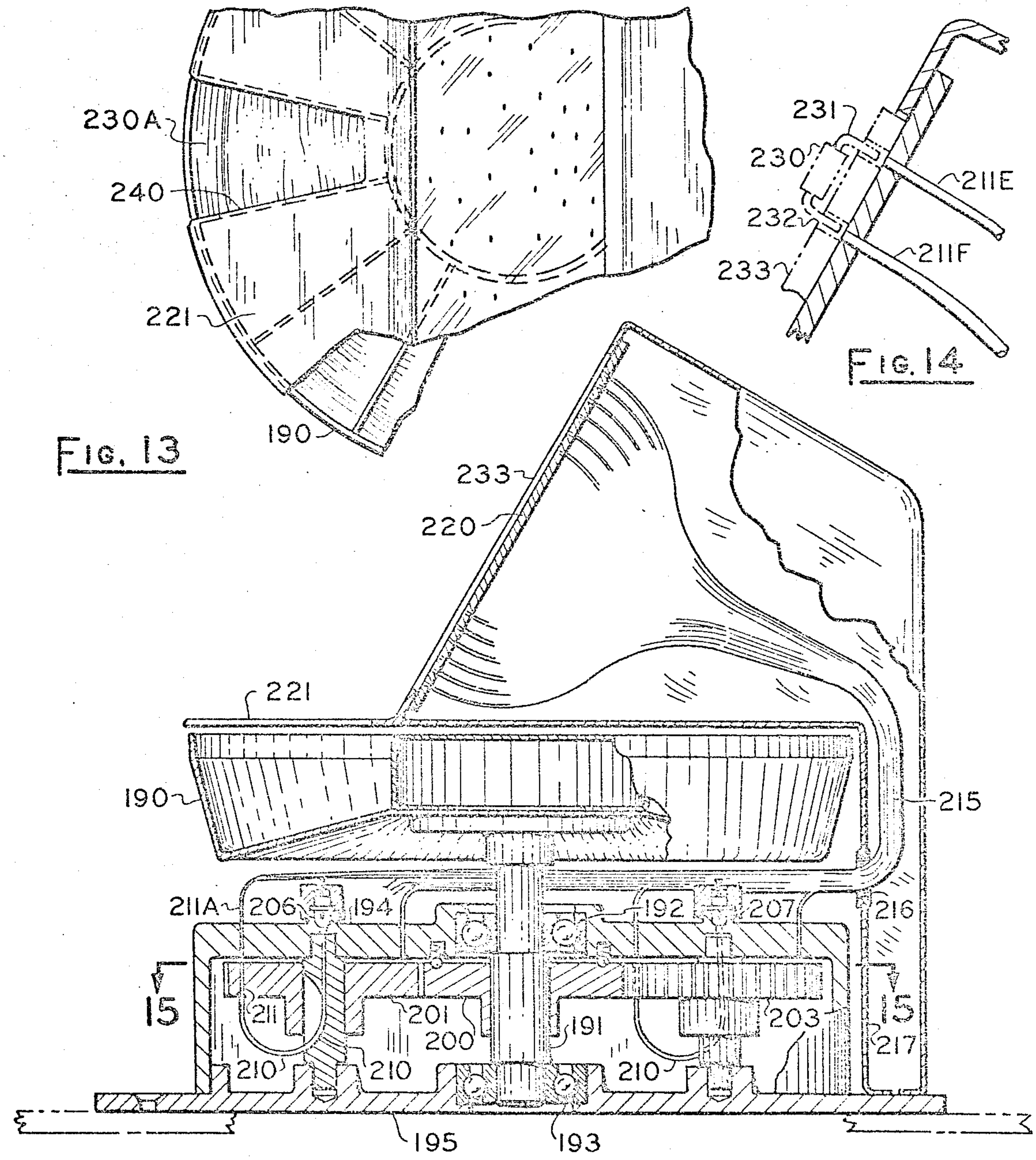
FIG. 12 is an elevational view partly in section of an arrangement for giving spot illumination for assembly operations.
FIG. 13 is a fragmentary top view of a tray or assembly element of FIG. 12.
FIG. 14 is an enlarged sectional detail showing an application of an assembly operation under guidance of the arrangement of FIG. 12.

Shaft 191 supports a central or sun gear 200 adapted to mesh with and drive a group of planetary gears 201, 202, 203, 204 and 205, respectively. These are shown in plan in FIG. 15. In FIG. 12 only two of the gears 201 and 203 are visible. Planetary gears are each mounted on a stub shaft which is supported in the upper and lower plates 194 and 195, respectively.

Each of the planetary gears 201, etc., is provided with a light source 206 or 207 as shown in FIG. 12. A light fiber 210 is aligned through the hub or axle of each planetary gear, looping down and then upward through a peripheral portion of the gear as shown in 211 in gear 201 at the left of FIG. 12. In this position, it aligns with a fiber element 211A connected into a cable 215 which carries all the light fibers through a grommet 216 in the right frame element 217 looping upward and spreading out to contact various precisely placed openings on a display panel 220. The latter is shown inclined above a cover plate 221. Plate 221 covers all but one compartment of the rotatable tray 190. Each of these light fibers is so arranged as to present a spot of light at the point where a particular component, for example, any one of several electronic components as already mentioned, is to be inserted in the board 233 that is being assembled on panel 220. FIG. 14 shows a typical electronic element, such as a resistor 230, having its prongs 231 and 232 inserted into the board 233 opposite the terminal ends of light fibers 211E and 211F. These, of course, come from the cable 215 previously mentioned.

In use, the operator rotates the tray to a particular component, for example, a group of small identical resistors 230. As the operator rotates tray 190, resistors 230 are set in front of him. The particular tray 230A, FIG. 13, clears a notch 240 in the cover plate 221, exposing the parts to be mounted on board 233. At this instant, light fibers on the panel 220 are illuminated, indicating to the operator the exact points where these particular components are to be assembled on the board. As all other areas on the panel are comparatively dark, errors are effectively prevented.

When assembly of these particular components is completed, the tray is rotated to the next position, exposing other and different parts through the gap 240. A new set of light fibers indicates where these new parts are to be assembled. The number of compartments in the tray 190 can vary greatly, of course, as many as 30 being used in one particular assembly operation.

Figure 15:
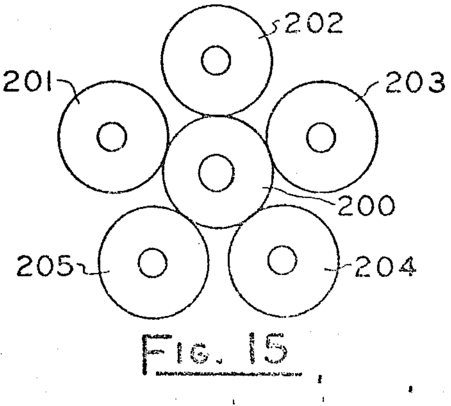
FIG. 15 shows a multiple gear arrangement for commutation, being taken substantially along the line 15—15 of FIG. 12.
Figure 16:
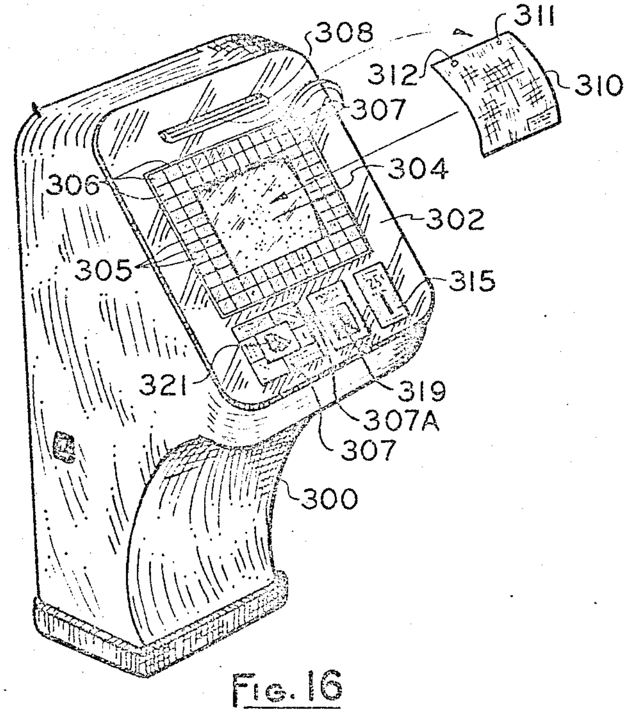
FIG. 16 is a perspective view of an apparatus embodiment useful as a locator and map indicator.
Figure 18:
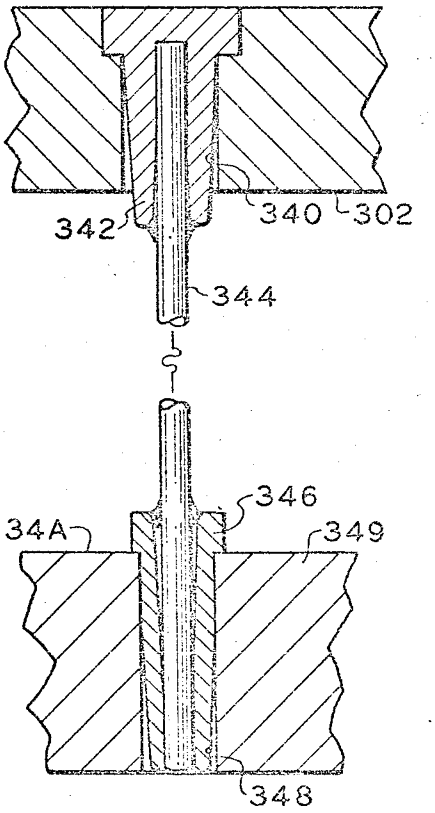
FIG. 18 is a detail in sectional view taken substantially along the line 18—18 of FIG. 17.

FIG. 15 shows the planetary arrangement of five planetary gears 201 to 205 around the central or sun gear 200. It would be understood, of course, that as many as 30 or some other numbers of gears can be used, depending on the particular need.

Obviously, the various optical fibers will be grouped and connected to the appropriate planetary gears so as to show the desired combination of assembly points. If necessary, a plurality of sets of gears, such as shown in FIG. 15, can be used.

FIGS. 16 to 20 show another and rather different use of the system. There is a need in airports and other places where travelers go for a simple means to guide them to hotels, motels, public places and to other prominent landmarks. Some airports are currently equipped with illuminated maps which show very well the relative positions of buildings and other features commonly sought for. The average traveler, however, cannot keep such map data in his mind for very long. The apparatus shown, to be described next in detail, is adapted to provide him quickly with a simple chart or map that will guide him from where he is to where he wants to go. It will be assumed to be set up in a station or analogous assembly place.

A stand or support 300 of suitable height and having a conveniently inclined front table or surface 302, has a central crowned illuminated display panel 304. Surrounding this central panel are lists of frequently wanted facilities, such as motels, hotels, recreational sites, historical monuments, churches, etc. These are displayed in groups 305, 306, 307 with names printed in quickly readable type. A dispensing device 308 is adapted to feed out a translucent map sheet 310 which is perforated at 311, 312, to fit on a pair of register pins 313, 314, at the top panel 304. Map sheet 310 bears a preprinted map of the city or area. This dispenser may be coin controlled, as at 315, or it may be manually operable, as will be obvious. A small pencil 317 may be placed in or dispensed automatically into a pocket 319 near the bottom of the inclined table 302.

Figure 17:
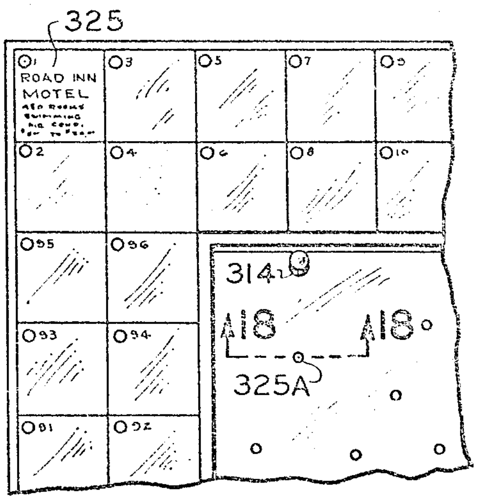
FIG. 17 is a fragmentary plan view of a display portion and associated parts of FIG. 16.
Figure 20:
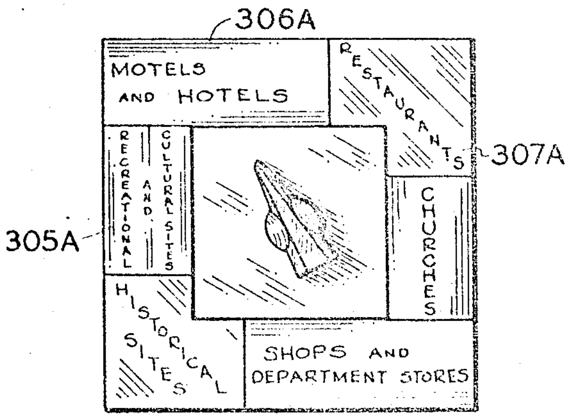
FIG. 20 is an enlarged plan view of the control device and index for the display area.

Having looked over the hotel and motel list, and having chosen the "Road Inn" motel, see enlargement in FIG. 17, the operator turns a pointer 321, located in a guadrangle at the left lower corner of the display, until a commutating light spot illuminates the appropriate box 325 for his motel. These boxes are numbered in series so they can quickly be located. Assuming that the operator (traveler) choses Box No. 1, dual illuminating lines or fibers are connected to the light source by commutating means as in FIGS. 1, 9 or 12. One fiber lights up a spot in the identifying Box No. 1, and the other pin-points on the display panel the exact location of the selected motel. A preferred arrangement alternates flashing lights at the box which names the facility and at the pin-point spot on the map. The map sheet, preprinted to show the city or area, as already mentioned, shows the main streets, highways and other physical features that the average unskilled reader can readily trace in pencil his route from the station where he is to the motel he has selected. He may also map out his itinerary from station to office building, to restaurant, to factory or plant, thence to historic sites, churches, etc., and finally to his hotel or other ultimate destination. By turning the pointer 321, FIG. 20, to each named objective in turn, the appropriate boxes 306 or 307, etc., will be illuminated and at the same time the corresponding point on the map 310 will be illuminated by the plug 342, FIG. 18, through the attached fiber optic line 344. The user takes a pencil 317 and draws a line from his present location, on the map, to the illuminated spot for his first objective, then switches the pointer 321 to the second objective, which lights up on the map, draws a pencil line to this point, and so on. Thus, a whole itinerary may be quickly marked on the map 310, which the user can take with him.

Figure 19:
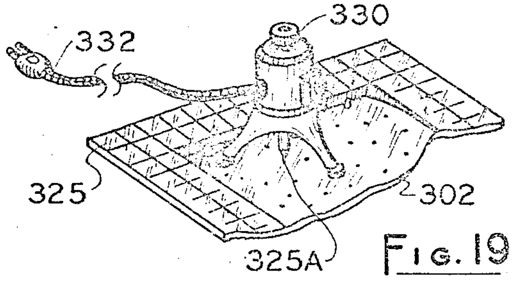
FIG. 19 is a fragmentary perspective view showing a tool and method for fitting out the apparatus of FIGS. 16, 17 and 18.

For wiring a new board, or updating an old one, the light fibers must be strung to appropriate commutator mechanism from the designated label or title box 305, 306 or 307, etc., and to corresponding points on the panel 304, which is the central part of the table or board 302. For this purpose, a pin-point electric drill device 330, FIG. 19, is provided. It is supported on legs so that it can be shifted around over panel 304 to the precise position of the facility to be wired. An electrical connection 332 supplies power to drill 330. After a suitable point has been located and drilled with a small guide hole, a step drill of suitable type is used to drill a plug hole 340, FIG. 18. A transparent plug 342, shaped to fit this hole 340, is secured by suitable cement to the light fiber 344. The latter is connected at its other end to a smaller plug 346 which is adapted to fit in a suitable opening 346 in a commutator element such as the peripheral part of a gear 34, or a part in alignment with such a gear. Compare the lower part of FIG. 1 with the lower part of FIG. 18. The commutator mechanism of FIG. 1, or that of other figures, such as FIG. 2A, FIG. 9 or FIG. 12, may be used for this purpose.

Obviously, various commutating mechanisms may be used in connection with the systems of FIGS. 16 to 20. The commutators in FIGS. 2A and 12 each have a plurality of light inputs to respective planetary gears and fiber optic assemblies. A modification of either of these, adapted for manual operation by the pointer 321, FIGS. 16 and 20, can be used. In a simple case, where there are only two planetary gears under control of the pointer (attached to a sun gear such as gear 45, FIG. 1), one planetary gear can distribute its light to the label or advertising box area 305 or 306, etc., and the other to the location spot or terminal 342 under the map on panel 304.

As suggested above, the illuminating source may be a continuously glowing bright light, or it may be intermittent. For intense illumination, a source such as a helium-neon laser can be used and switched back and forth by a suitable beam rotator so that its light energy is delivered intermittently, first to the center of a planetary gear (such as 34, 35, FIG. 1) which distributes light to the corresponding advertising box 305, etc. Such an intermittent alternating lighting of the map point and the box is quickly perceptible to the user. The beam rotating device is not illustrated or described in this application but is an obvious variation on the commutator mechanisms which are illustrated and described in detail.

In the various embodiments described, it will be noted that a beam of light, originating at a suitable source, is selectively transmitted between either a single terminal or a multiple terminal, on the one hand, and a selected one (or more) of a group or plurality of terminals on the other hand. Selection and light shifting is accomplished by a commutator, which may be manually movable, as in FIGS. 12, 16 and 20, or motor driven under manual (or pedal) control, as in FIGS. 7 to 10, or automatically motor driven, as in FIGS. 1, 2, 2A, 3, 5 and 11. The originating terminal may be either a light transmitter, or generator or a light sensor, as in FIGS. 1, 2A, 7. In some cases, a plurality of light sources may be used. At the other terminal, a single light or light sensor may be positioned, as in FIGS. 1 and 11, or the light may simply terminate as one or more lighted spots or areas, as in FIGS. 2, 3 4A, 7, 14, and 16 to 19. In general, light passes between one terminal (which can be a light source, a light detector or an area to be illuminated) through a conductor which connects it to the fixed terminal of the commutator. The light is conducted between this fixed terminal (i.e., the center or hub 34 or 34A, FIG. 1, or 73 or 74, FIG. 2A) and the movable terminal (periphery of gear or disc, such as 36, FIG. 1). The movable terminal can be shifted selectively, either manually or by intermittent or continuous motor drive, to various commutating positions. At each of these positions, a light conductor, preferably a flexible fiber optic or light fiber, is precisely positioned. Means such as the ball detent 50, or a plurality of such detents, FIG. 1, insure alignment between the movable commutator element and the selected conductor, as is obvious.

Obviously, not all of the conductors need to be flexible light fibers; see the lens and prism system of FIG. 9. However, the use of fibers bundled into cables becomes essential when large numbers of them must be led through non-linear paths, as shown in most of the systems illustrated. In the systems of FIGS. 1 and 11, the light sensor is used to initiate a signal or a recording operation, as where a perforation in the card, FIG. 1A, allows a light to pass or where misalignment of the light conductors interrupts a continuous beam, as in FIG. 11. In most of the other systems illustrated, there is no detector as the light is used for illumination, but the means for transmitting and commutating the light are either identical or are closely similar.

It will be obvious that other and different modifications may be made within the spirit and scope of the invention, and that it may be used in systems quite different in detail from those illustrated. It is intended by the claims which follow to cover the described invention as broadly as the prior art properly permits.

What is claimed is:

1. The method of scanning an object or area and thereby producing signals by means of light, which comprises the following steps in sequence:

a. passing light from a light source through and along the axis of rotation of a rotatable commutation device and thence through a marginal part of said device which part describes a circular path;

b. simultaneously conducting light from a marginal part of a separate rotatable commutation device which also describes a circular path and thence passing said light through and along the axis of said separate device and on to a light sensing operation;

c. selectively shifting the first named device about its axis to progressively scan said object or area while similarly shifting the second device;

d. selectively passing light from said first circular path to the object or area to be scanned through successive light conductors arranged in a predetermined sequence with respect to said object or area; while e. simultaneously transmitting light signals from the scanned object or area through a second series of light conductors arranged in similar predetermined sequence, while shifting the devices as aforesaid thereby to convey the transmitted light from the area of object to the second named circular path and thence through the axis of the second device; and f. detecting the light so transmitted.

2. Method according to claim 1 in which said selective shifting connects the light path with each of said plurality of conductors in a predetermined and regular order.

3. Method according to claim 2 in which the selected shifting is utilized to scan a data-bearing record and record data therefrom.

4. Method according to claim 2 in which the selected shifting is used to illuminate an object progressively and in a predetermined order.

5. Method according to claim 1 in which the desired one of said plurality of light conductors is selected manually.

6. Apparatus for scanning and for producing light signals which comprises, in combination, a first and a second commutator each rotatable about an axis, said axes being laterally spaced from each other and parallel, each commutator having an axial light passage and a radially spaced passage parallel to the axis and a light conductive element conducting two passages in each commutator, the arrangement being such that when either commutator is rotated about its axis the radially spaced passage defines a circular path centered on the axis, a first and a second series of light conductor elements, one series for the first and the other for the second commutator, said series of elements being arranged respectively to illuminate and to receive light from the object or area being scanned, a light source, a conductor arranged to carry light from the source to the axial passage of the first commutator, a light sensor device, a light conductor arranged to carry light from the axis of the second commutator to the light sensor, and means for simultaneously and in unison positioning selectively and rotating the two commutators to simultaneously position a conductor of the first series opposite a point to be scanned and to position a conductor of the second series at the proper point to conduct light from the point scanned through the second commutator and on to light sensing.

7. Apparatus according to claim 6 in which the first commutator is manually operable and includes a pointer for selecting a desired object in a geographic and in which the second commutator is arranged to direct the output light signal to illuminate a corresponding point on a map.

8. Apparatus according to claim 6 which includes motor means for moving said commutator.

9. Apparatus according to claim 6 in which the plurality of light conductor elements are arranged to sense a line of data on a perforated record member.

10. Apparatus according to claim 6 which includes a plurality of illuminating elements, at least one of said plurality of light conductor elements being connected for light conductance to each of said illuminating elements.

11. Apparatus according to claim 10 in which two of said light conductor elements are connected to an illuminating element, thereby to conduct light thereto from two conductors.

12. Apparatus according to claim 10 in which at least some of the conductor elements consist of light fibers surface treated to emit light from within.

13. Apparatus according to claim 6 in which the plurality of light conductor elements are flexible light fibers.

14. Apparatus according to claim 6 in which a light source is positioned at one terminal of one commutator and a light detector at the other commutator.

15. Apparatus according to claim 6 which includes a viewing device and in which the ends of the plurality of conductors are arranged to illuminate in a selective and moving pattern an object positioned in front of the viewing device.

16. Apparatus according to claim 6 which includes a movable tray of small parts arranged for assembly, means connecting said tray to the movable commutator, and the plurality of light conductors being arranged to illuminate preselected areas for positioning said small parts in said assembly.

17. Apparatus according to claim 6 which comprises, in combination, a display surface indicating physical features of a region, a plurality of box areas individually related respectively to one of said physical features, one of said plurality of light conductor elements being connected to each of said box areas and adapted to illuminate said area, and a second conductor associated with each of said connected elements and arranged to illuminate the particular physical features of said area related to said box area.

18. Apparatus according to claim 11 in which a manually movable pointer for selecting a box area is connected to and drives the commutator.

19. Apparatus according to claim 6 which includes means for selectively changing the color of the conveyed light.

* * * * *